(12) United States Patent
Jhuang et al.

(10) Patent No.: US 11,990,293 B2
(45) Date of Patent: May 21, 2024

(54) MODULAR FRAME

(71) Applicant: PEGATRON CORPORATION, Taipei (TW)

(72) Inventors: Bo-Wun Jhuang, Taipei (TW); Hsin-Min Tien, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 359 days.

(21) Appl. No.: 17/376,043

(22) Filed: Jul. 14, 2021

(65) Prior Publication Data

US 2022/0093351 A1 Mar. 24, 2022

(30) Foreign Application Priority Data

Sep. 21, 2020 (TW) ................................ 109132511

(51) Int. Cl.
*H01H 13/86* (2006.01)
*H01H 13/88* (2006.01)
*G06F 1/16* (2006.01)

(52) U.S. Cl.
CPC ............ *H01H 13/86* (2013.01); *H01H 13/88* (2013.01); *G06F 1/1662* (2013.01); *H01H 2223/034* (2013.01); *H01H 2231/002* (2013.01)

(58) Field of Classification Search
CPC ............................... H01H 13/86; H01H 13/88
USPC ........................................................ 428/134
See application file for complete search history.

(56) References Cited

U.S. PATENT DOCUMENTS

| | | | |
|---|---|---|---|
| 7,850,378 B1 * | 12/2010 | Ligtenberg | G06F 1/1662 400/490 |
| 2013/0227836 A1 * | 9/2013 | Whitt, III | G06F 1/1616 29/622 |
| 2016/0307713 A1 | 10/2016 | Zhang | |
| 2017/0110268 A1 | 4/2017 | Tachikawa | |

(Continued)

FOREIGN PATENT DOCUMENTS

| CN | 201622533 | | 11/2010 |
|---|---|---|---|
| CN | 201622533 U | * | 11/2010 |

(Continued)

OTHER PUBLICATIONS

Machine_English_translation_CN_201622533_U; Guo, et. al, Modularized frame of chocolate keyboard; Nov. 3, 2010, EPO; whole document (Year: 2023).*

(Continued)

*Primary Examiner* — Tahseen Khan
(74) *Attorney, Agent, or Firm* — J.C. PATENTS

(57) ABSTRACT

A modular frame including a push-button area is provided. The push-button area has a function key hole group, an alphabet key hole group, a number key hole group, a shift key hole, a space key hole, a backspace key hole, and an enter key hole. The shift key hole is located at one side of the alphabet key hole group and has a first processing region. The space key hole is disposed at a bottom end of the push-button area and has second, third, and fourth processing regions. The backspace key hole has a fifth processing region. The enter key hole is located below the backspace key hole and has sixth and seventh processing regions. The first to seventh processing regions may be selectively performed with a process to switch the modular frame to a first, second, or third configuration.

11 Claims, 11 Drawing Sheets

(56) References Cited

U.S. PATENT DOCUMENTS

2018/0267622 A1* 9/2018 Meng ................ G06F 3/0238
2021/0208692 A1* 7/2021 Shao ................ H01H 13/14

FOREIGN PATENT DOCUMENTS

CN 102053706 5/2011
TW M390487 10/2010

OTHER PUBLICATIONS

"Search Report of Europe Counterpart Application", dated Jan. 17, 2022, p. 1-p. 8.

* cited by examiner

MODULAR FRAME

CROSS-REFERENCE TO RELATED APPLICATION

This application claims the priority benefit of Taiwanese application no. 109132511, filed on Sep. 21, 2020. The entirety of the above-mentioned patent application is hereby incorporated by reference herein and made a part of this specification.

BACKGROUND

Technical Field

The disclosure relates to a modular frame; particularly, the disclosure relates to a modular frame that may be selectively switched to different keyboard configurations.

Description of Related Art

Notebook computers have a wide range of applications, including paperwork, software design, drawing, and video viewing. In the existing notebook computers, keyboards are mainly divided into three keyboard configurations, i.e., US keyboard, UK keyboard, and JIS keyboard. Therefore, in production, it is necessary to develop corresponding molds in accordance with the US, UK, and JIS configurations. In the current way, the production costs of the keyboard are increased.

Conventionally, the keyboard of a notebook computer is different from that of a desktop computer for the reason that the space in the notebook is relatively small, and an alphabet key region, function key region, word processing key region, and number key region thereof need to be integrated into the relatively small notebook keyboard. The main difference between the US, UK, and JIS keyboard configurations lies in the enter key, shift key, and space key, and the rest of the key regions are the same.

SUMMARY

The disclosure provides a modular frame, which is applicable to US, UK, and JIS keyboard configurations by arranging forms of push-button holes through processing. As such, it is possible to prevent frames of different configurations from material shortage or excess inventory, effectively saving the production costs.

A modular frame of the disclosure includes a push-button area. The push-button area includes a function key hole group, an alphabet key hole group, a number key hole group, a shift key hole, a space key hole, a backspace key hole, and an enter key hole. The function key hole group is disposed at a top end of the push-button area. The alphabet key hole group is disposed at a middle of the push-button area. The number key hole group is disposed between the function key hole group and the alphabet key hole group. The shift key hole is located at one side of the alphabet key hole group and includes a first processing region. The space key hole is disposed at a bottom end of the push-button area opposite to the function key hole group and includes a second processing region, a third processing region, and a fourth processing region. The backspace key hole is located between the function key hole group and the alphabet key hole group and at one side of the number key hole group, and the backspace key hole includes a fifth processing region. The enter key hole is located in the alphabet key hole group and below the backspace key hole and includes a sixth processing region and a seventh processing region. The first processing region to the seventh processing region may be selectively performed with a process to switch the modular frame to a first configuration, a second configuration, or a third configuration.

Based on the foregoing, the modular frame of the disclosure has the first processing region to the seventh processing region on which processes (such as a punching, cutting, or hot melt process) may be selectively performed to change the keyboard configuration. It is not only possible that the rib structures formed in the first processing region to the seventh processing region are adapted to be selectively cut through a punching or cutting process, thereby switching the modular frame to the first configuration, the second configuration, or the third configuration, but the rib structure may also be selectively mounted in the first processing region to the seventh processing region, and multiple rib structures may be fixed to the corresponding first processing region to seventh processing region adopting a hot melt process, thereby switching the modular frame to the first configuration, the second configuration, or the third configuration.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
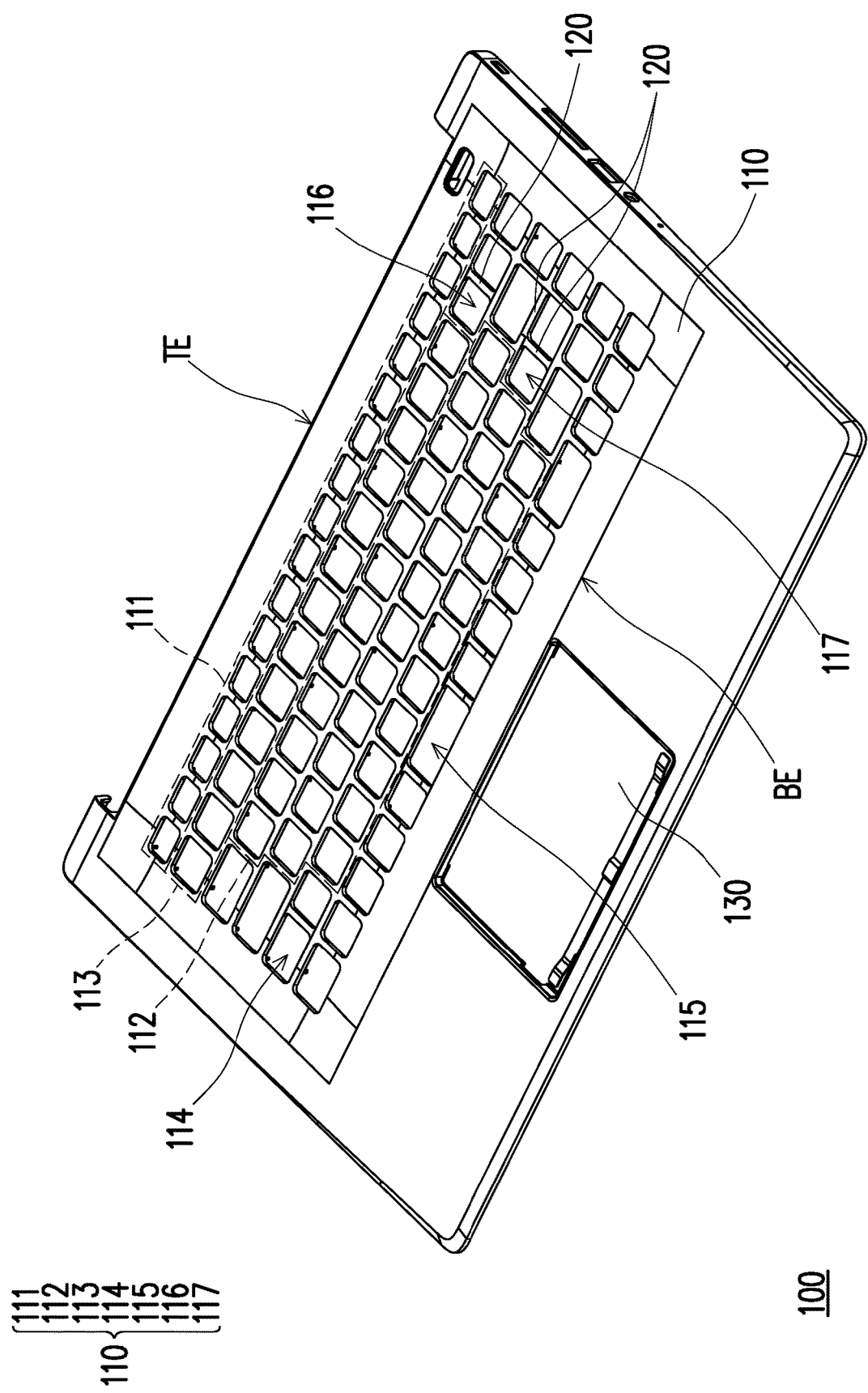
FIG. 1A is a schematic perspective view of a modular frame according to an embodiment of the disclosure.

FIG. 1A is a schematic perspective view of a modular frame according to an embodiment of the disclosure. FIG.

1B is a schematic top plan view of the modular frame of FIG. 1A. FIG. 1C is a schematic diagram showing processing of the modular frame of FIG. 1B where a punching process is adopted. FIG. 1D is a schematic diagram showing processing of the modular frame of FIG. 1B where a cutting process is adopted.

Figure 1B:
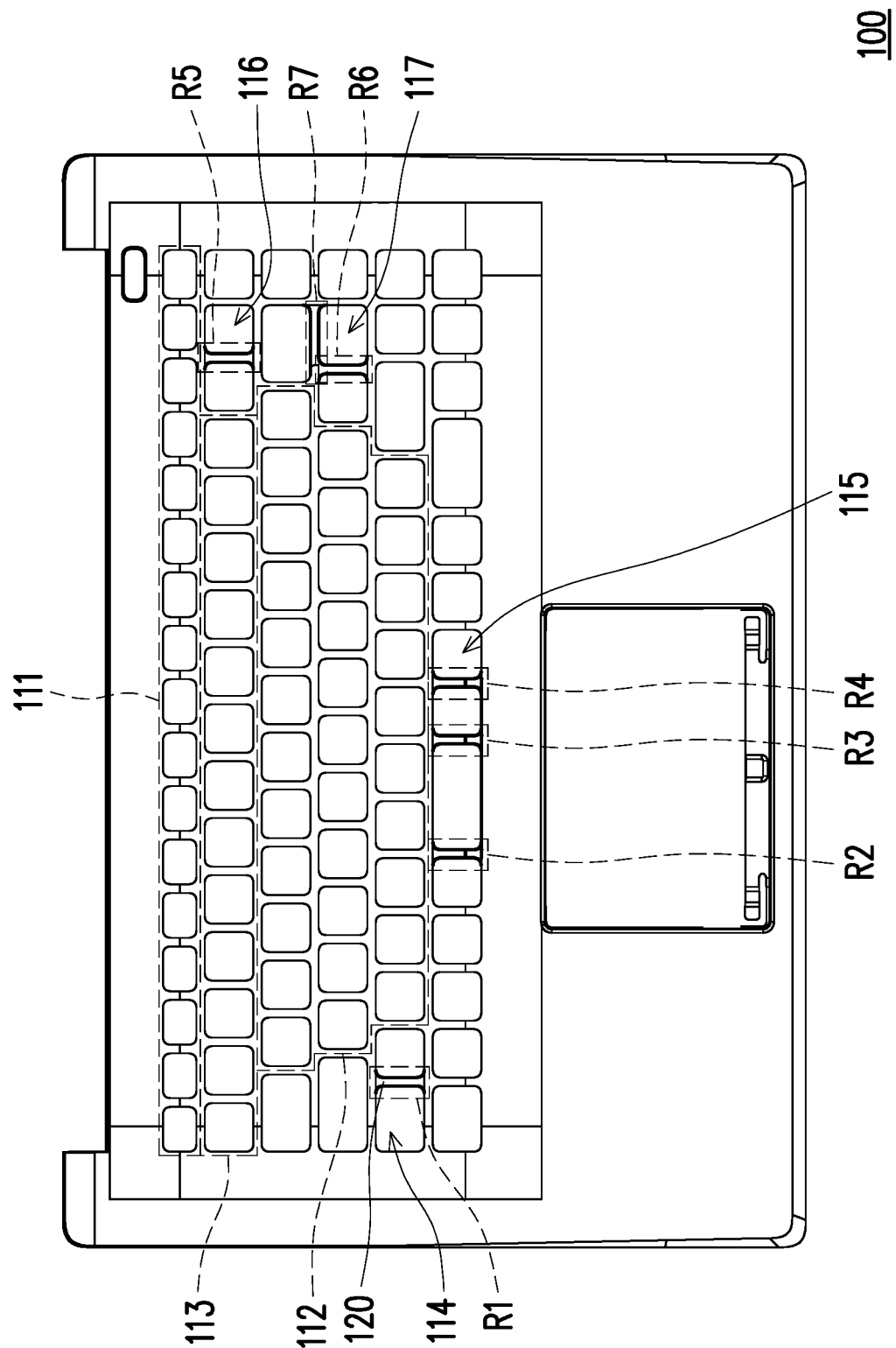
FIG. 1B is a schematic top plan view of the modular frame of FIG. 1A.
Figure 1C:
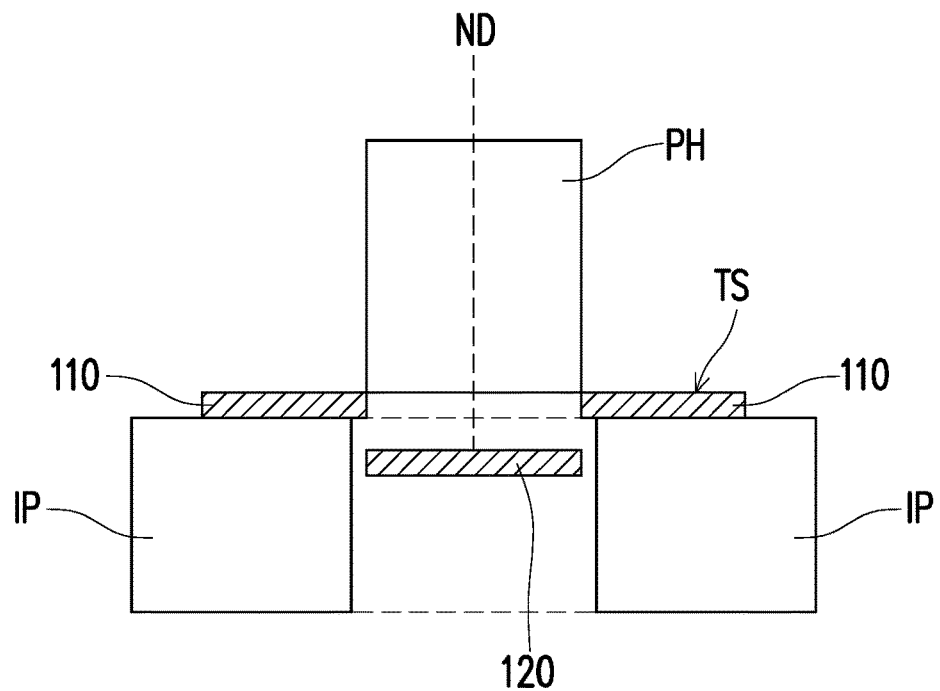
FIG. 1C is a schematic diagram showing processing of the modular frame of FIG. 1B where a punching process is adopted.
Figure 1D:
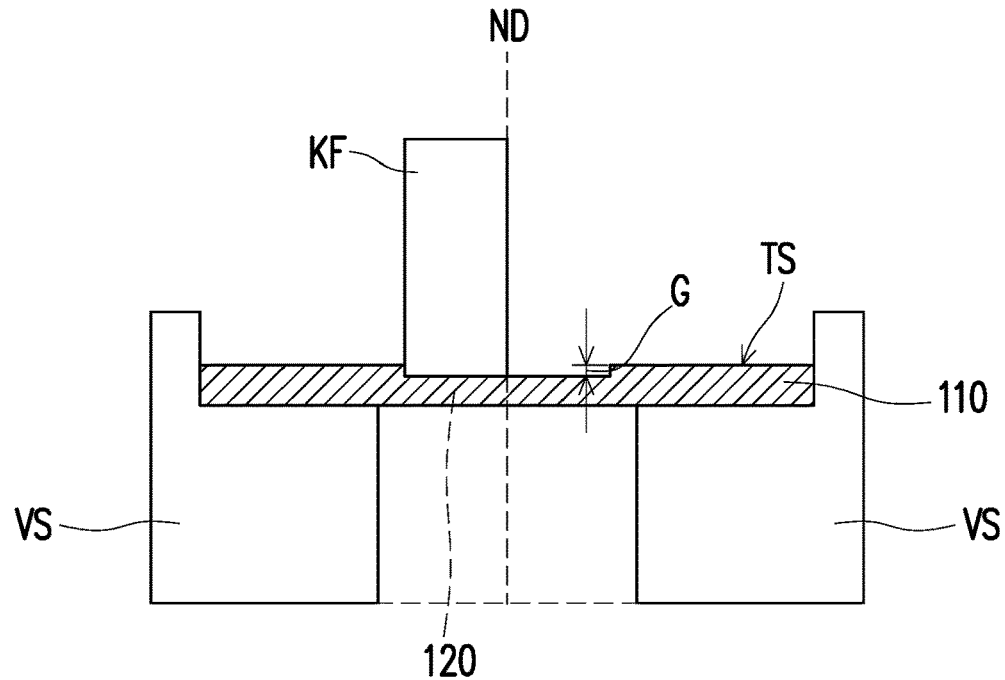
FIG. 1D is a schematic diagram showing processing of the modular frame of FIG. 1B where a cutting process is adopted.

With reference to FIG. 1A and FIG. 1B, a modular frame 100 of the disclosure includes a push-button area 110 and a plurality of rib structures 120. The push-button area 110 includes a function key hole group 111, an alphabet key hole group 112, a number key hole group 113, a shift key hole 114, a space key hole 115, a backspace key hole 116, and an enter key hole 117. The modular frame 100 is applicable to a keyboard of a notebook computer, and formats of the keyboard may be divided into US, UK, and JIS keyboard configurations. The modular frame may further include a touch area 130.

With reference to FIG. 1A and FIG. 1B, the function key hole group 111 is disposed at a top end TE of the push-button area 110 and is presented in a long strip shape. The alphabet key hole group 112 is disposed at a middle of the push-button area 110. The number key hole group 113 is disposed between the function key hole group 111 and the alphabet key hole group 112.

The shift key hole 114 is located at one side of the alphabet key hole group 112, and the shift key hole 114 includes a first processing region R1. The space key hole 115 is disposed at a bottom end BE of the push-button area 110 opposite to the function key hole group 111, and the space key hole 115 includes a second processing region R2, a third processing region R3, and a fourth processing region R4. The backspace key hole 116 is located between the function key hole group 111 and the alphabet key hole group 112 and at one side of the number key hole group 113, and the backspace key hole 116 includes a fifth processing region R5. The enter key hole 117 is located in the alphabet key hole group 112 and below the backspace key hole 116, and the enter key hole 117 includes a sixth processing region R6 and a seventh processing region R7. The rib structures 120 are selectively disposed in the first processing region R1 to the seventh processing region R7.

With reference to FIG. 1A and FIG. 1B, the rib structures 120 may be formed in the first processing region R1 to the seventh processing region R7, respectively. In this embodiment, each rib structure 120 may be integrally formed with each corresponding processing region (R1 to R7). By each of the rib structures 120, the shift key hole 114 is divided into two sub-key holes; the space key hole 115 is divided into four sub-key holes, and the three rib structures 120 of the space key hole 115 are parallel to each other; the backspace key hole 116 is divided into two sub-key holes; and the enter key hole 117 is divided into three sub-key holes, and the two rib structures 120 in the enter key hole 117 are perpendicular to each other.

The touch area 130 is adjacent to the bottom end BE of the push-button area 110, and the touch area 130 is configured to be mounted with a touch panel.

With reference to FIG. 1A, FIG. 1C, and FIG. 1D, the modular frame 100 of this embodiment includes a plurality of rib structures 120 integrally formed. Through a punching or cutting process, the rib structures 120 formed in the first processing region R1 to the seventh processing region R7 may be selectively cut to switch the push-button area 110 to a first configuration (corresponding to a US keyboard configuration), a second configuration (corresponding to a UK keyboard configuration) or a third configuration (corresponding to a JIS keyboard configuration). Briefly speaking, through a punching process or cutting process, the redundant rib structures 120 are cut and removed from the push-button area 110, such that keys in the US, UK, and JIS keyboard configurations can be accommodated.

With reference to FIGS. 1C and 1D, a gap G is formed between each rib structure 120 and a top surface TS of the push-button area 110. When punching or cutting is utilized to cut the rib structure 120, the gap G prevents residual burrs on the top surface TS of the push-button area 110 after the rib structure 120 is cut.

In addition, referring to FIG. 1C, during a punching process, the push-button area 110 is placed on two inserts IP and the rib structure 120 to be cut is suspended between the two inserts IP. Then, a punch head PH is aligned with the rib structure 120 to be cut along a normal direction ND of the push-button area 110. Then, the punch head PH is activated to strike toward the rib structure 120 to be cut so as to cut the rib structure 120. After the cutting is completed, the push-button area 110 may be removed. Alternatively, another rib structure 120 to be cut may be suspended between the two inserts IP, and the above process may be repeated.

In addition, referring to FIG. 1D, during a cutting process, the push-button area 110 is clamped by a vise VS, and the rib structure 120 to be cut is suspended between the vise VS. Text, a knife KF is moved toward the rib structure 120 to be cut along the normal direction ND of the push-button area 110 so as to cut the rib structure 120. After the cutting is completed, the push-button area 110 may be removed. Alternatively, another rib structure 120 to be cut may be suspended between the vise VS, and the above process may be repeated.

Figure 2A:
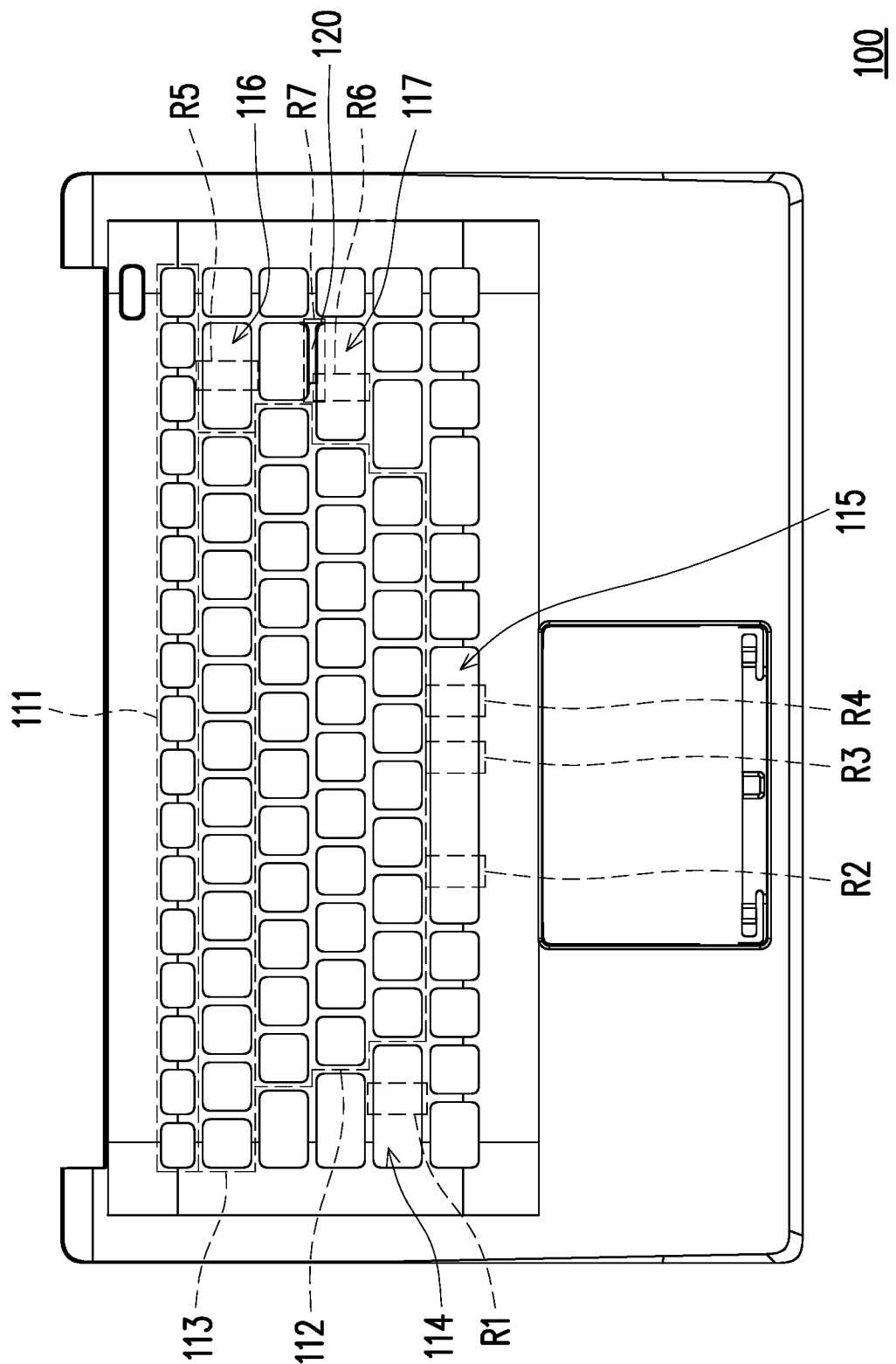
FIG. 2A is a schematic top plan view of the modular frame of FIG. 1B switched to the first configuration.

FIG. 2A is a schematic top plan view of the modular frame of FIG. 1B switched to the first configuration.

With reference to FIG. 1B and FIG. 2A, when the modular frame 100 is to be switched to the first configuration (see FIG. 2A), the rib structures 120 formed in the first processing region R1 to the sixth processing region R6 are cut through a punching or cutting process, to present the shift key hole 114, the space key hole 115, and the backspace key hole 116 each as a single key hole in a rectangular appearance, and present the enter key hole 117 as two sub-key holes by the rib structure 120 of the seventh processing region R7.

Figure 2B:
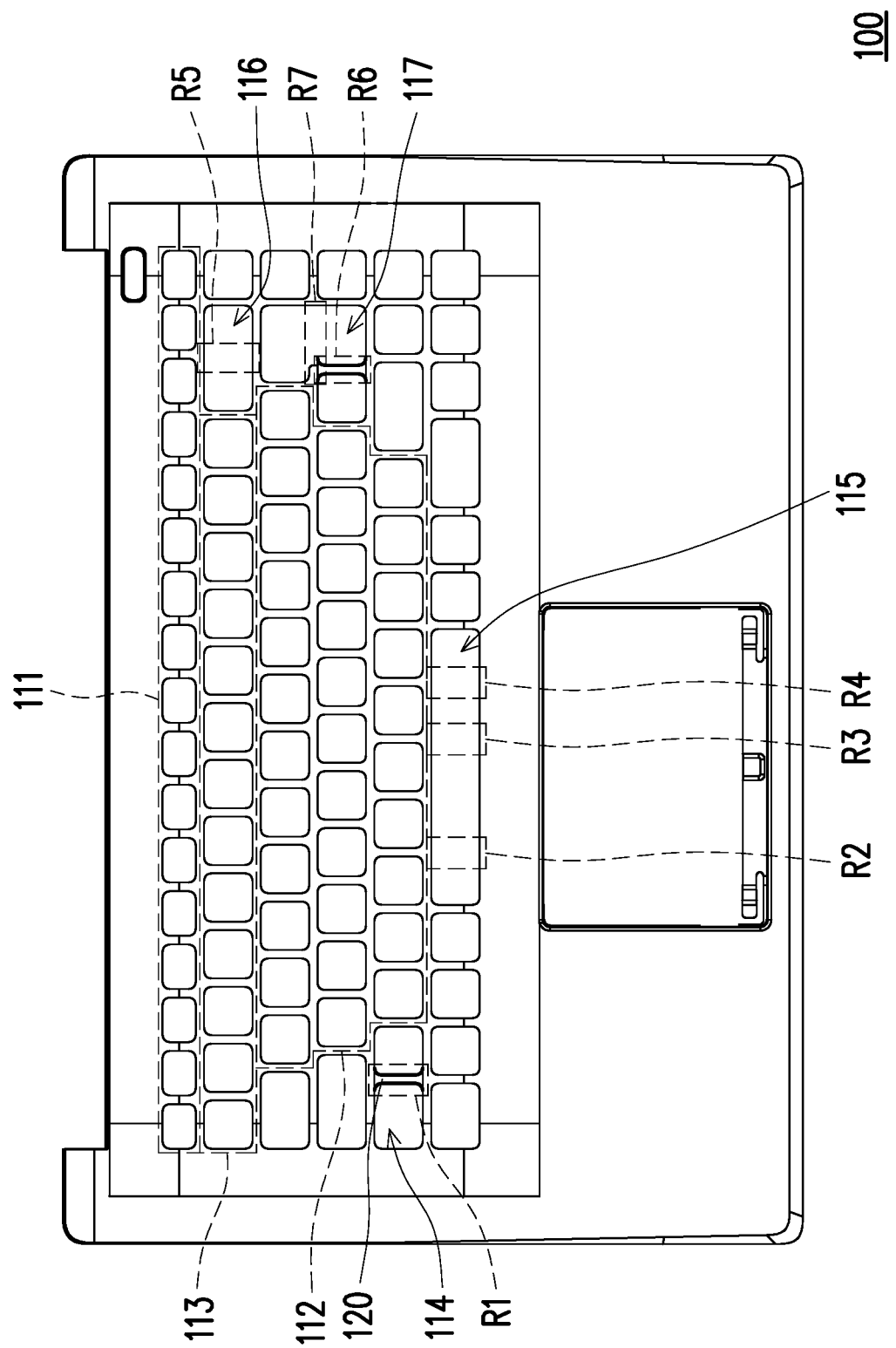
FIG. 2B is a schematic top plan view of the modular frame of FIG. 1B switched to the second configuration.

FIG. 2B is a schematic top plan view of the modular frame of FIG. 1B switched to the second configuration.

With reference to FIG. 1B and FIG. 2B, when the modular frame 100 is to be switched to the second configuration (see FIG. 2B), the rib structures 120 in the second processing region R2 to the fifth processing region R5 and the seventh processing region R7 are cut through a punching or cutting process, to present the space key hole 115 and the backspace key hole 116 each as a single key hole in a rectangular appearance, present the shift key hole 114 as two sub-key holes by the rib structure 120 of the first processing region R1, and present the enter key hole 117 as two sub-key holes by the rib structure 120 of the sixth processing region R6.

Figure 2C:
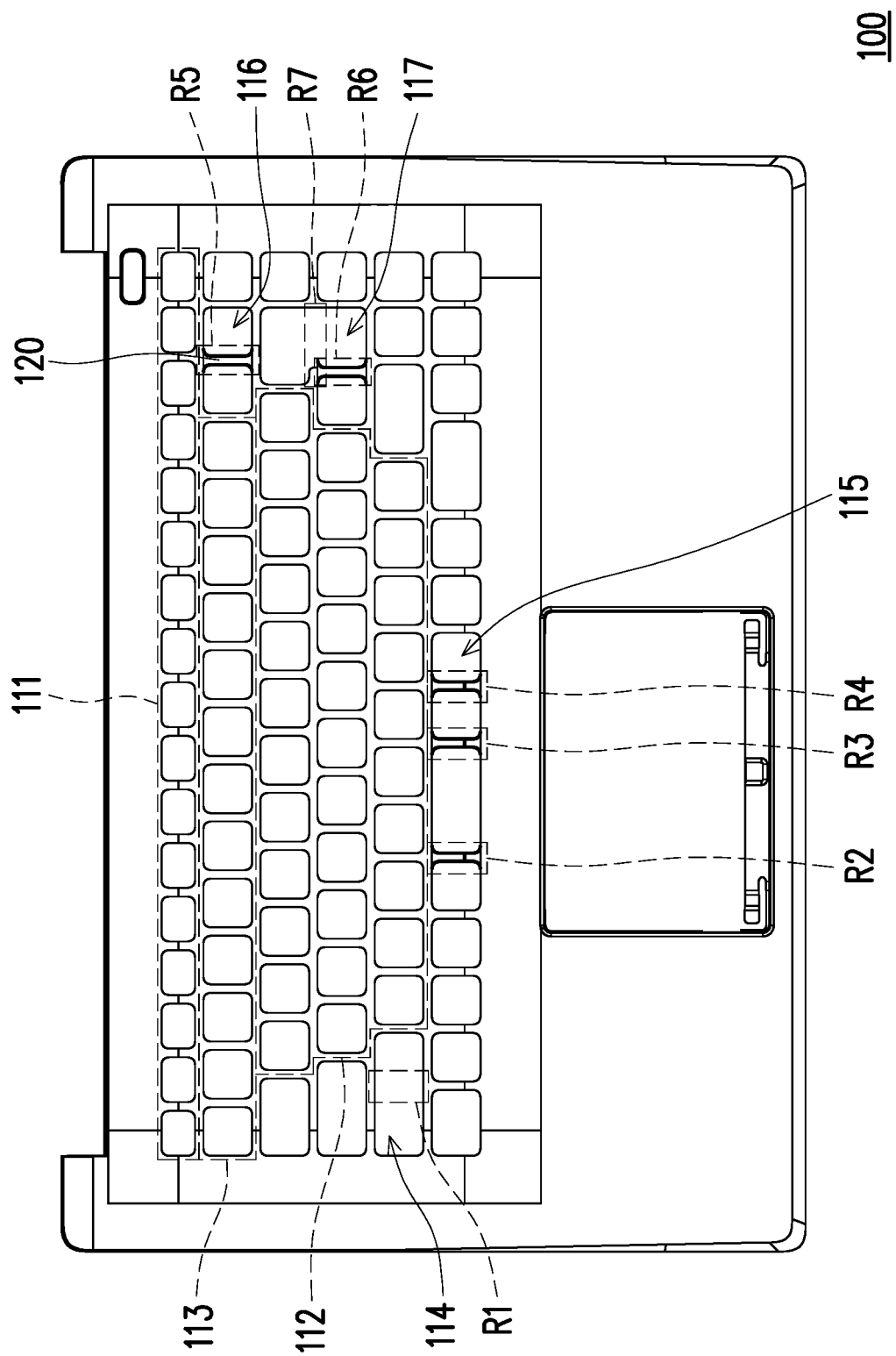
FIG. 2C is a schematic top plan view of the modular frame of FIG. 1B switched to the third configuration.

FIG. 2C is a schematic top plan view of the modular frame of FIG. 1B switched to the third configuration.

Refer to FIG. 1B and FIG. 2C, when the modular frame 100 is switched to the third configuration (see FIG. 2C), the two rib structures 120 formed in the first processing region R1 and the seventh processing region R7 are cut through a punching or cutting process, to present the shift key hole 114 as a single key hole in a rectangular appearance, and present the enter key hole 117 as two sub-key holes by the rib structure 120 of the sixth processing region R6. In addition, the space key hole 115 is divided into four sub-key holes by the three rib structures 120 in the second processing region R2 to the fourth processing region R4, and the backspace key hole 116 is presented as two sub-key holes by the rib structure 120 of the fifth processing region R5.

Figure 3A:
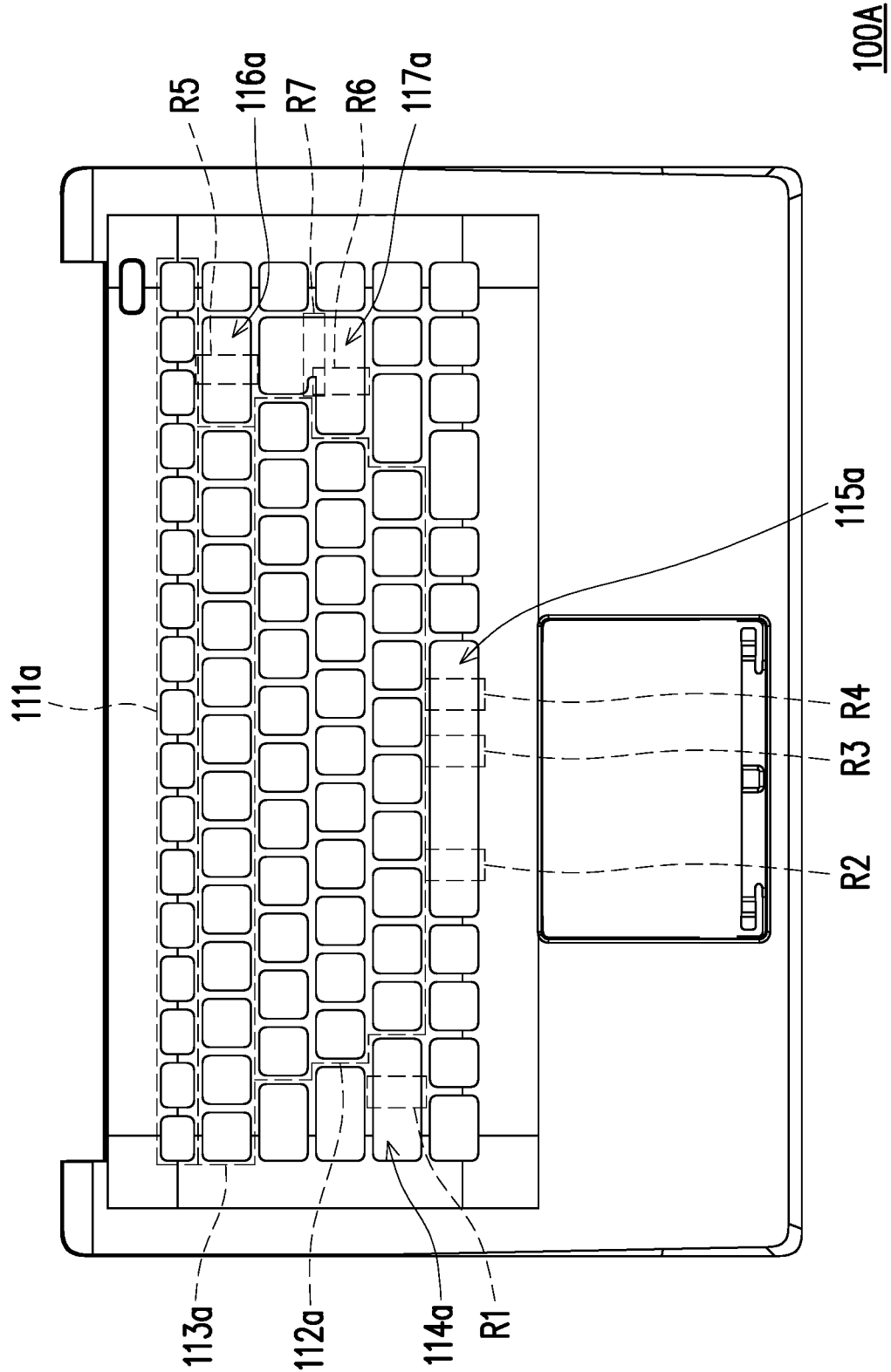
FIG. 3A is a schematic top plan view of a modular frame according to another embodiment of the disclosure.
Figure 3B:
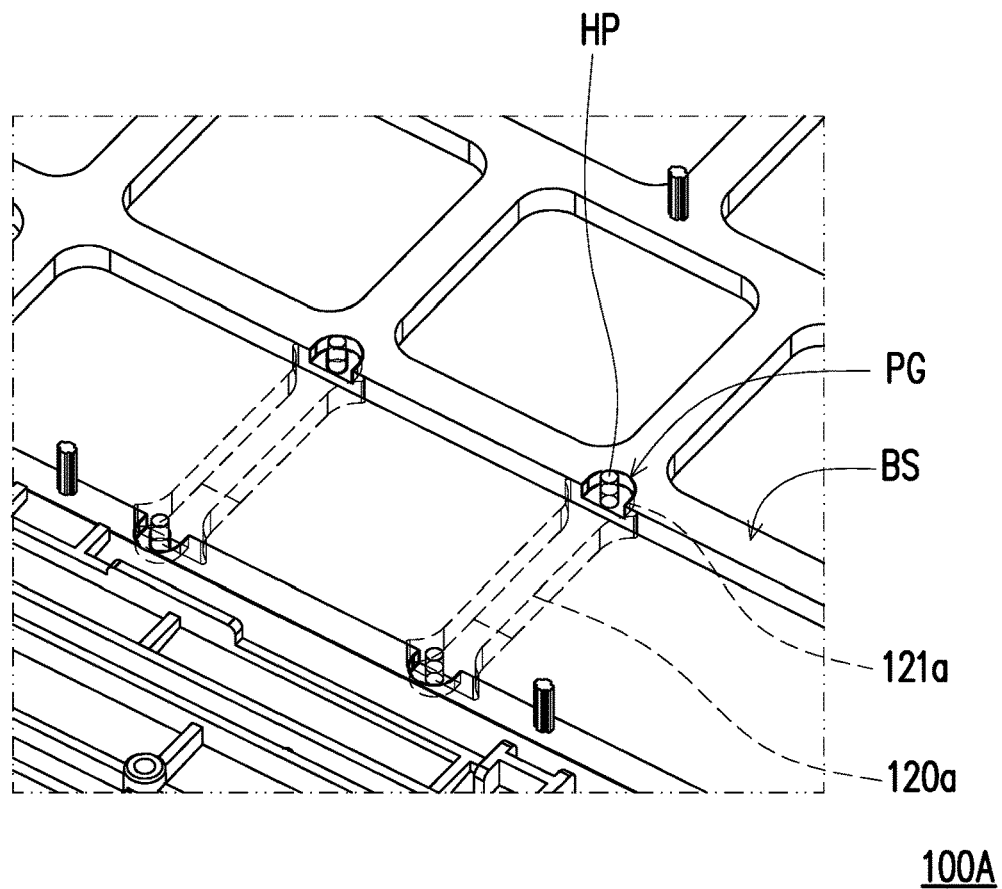
FIG. 3B is a perspective view of the modular frame of FIG. 3A combined with a rib structure.
Figure 3C:
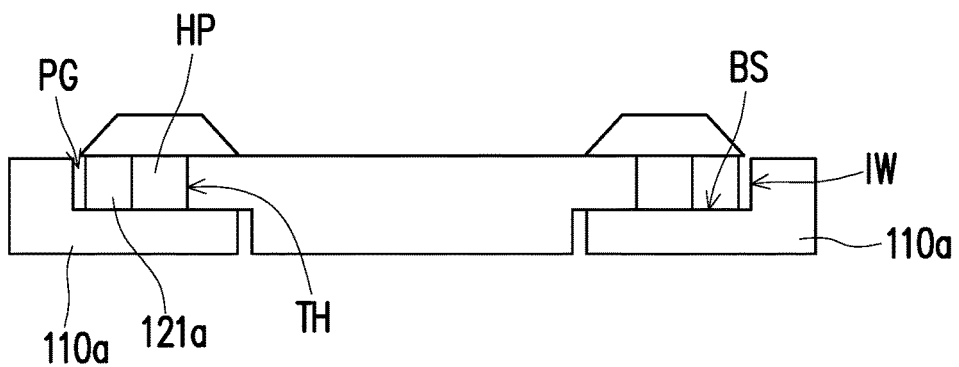
FIG. 3C is a schematic diagram showing processing of the modular frame of FIG. 3B where a hot melt process is adopted.

FIG. 3A is a schematic top plan view of a modular frame according to another embodiment of the disclosure. FIG. 3B is a perspective view of the modular frame of FIG. 3A combined with a rib structure. FIG. 3C is a schematic diagram showing processing of the modular frame of FIG. 3B where a hot melt process is adopted.

With reference to FIG. 3A and FIG. 3B, the difference between a modular frame 100A of this embodiment and the modular frame 100 of FIG. 1B is lies the following. The modular frame 100A includes a push-button area 110a and at least one rib structure 120a. The push-button area 110a includes a function key hole group 111a, an alphabet key hole group 112a, a number key hole group 113a, a shift key hole 114a, a space key hole 115a, a backspace key hole 116a, and an enter key hole 117a. The modular frame 100A is applicable to a keyboard of a notebook computer, and formats of the keyboard may be divided into US, UK, and JIS keyboard configurations. The at least one rib structure 120a is selectively disposed in at least one of the first processing region R1 to the seventh processing region R7. In this embodiment, the at least one rib structure 120a may be not integrally formed with each corresponding processing region (R1 to R7). In this embodiment, the rib structure 120a is an external member and includes a plurality of rib structures, and the number of the rib structures depends on the requirements of the corresponding keyboard configuration.

With reference to FIG. 3B and FIG. 3C, each of the at least one rib structure 120a includes two engaging portions 121a and two through holes TH, and at least one of the first processing region R1 to the seventh processing region R7 includes two positioning grooves PG and two hot melt pillars HP. Specifically, each positioning groove PG is formed on a bottom surface BS of the push-button area 110a, and each hot melt pillar HP is disposed in each positioning groove PG.

The two engaging portions 121a of each of the at least one of rib structure 120a are adapted to be disposed in the corresponding two positioning grooves PG and are rubbed and contacted by an inner wall IW. The two through holes TH are adapted to be sleeved on the corresponding two hot melt pillars HP.

During a punching process, heat is transferred through an external heat source to each hot melt pillar HP, such that an end of each hot melt pillar HP passing through each through hole TH melts when heated, to adhere the at least one rib structure 120a to the push-button area 110a. Thereby, the at least one rib structure 120a is fixed to at least one of the first processing region R1 to the seventh processing region R7, then switching the modular frame 100A to the first configuration (corresponding to the US keyboard configuration), the second configuration (corresponding to the UK keyboard configuration), or the third configuration (corresponding to the JIS keyboard configuration). In addition, since a melting point of the rib structure 120a is higher than a melting point of the hot melt pillar HP, the rib structure 120a remains in its original state during heating.

Figure 4A:
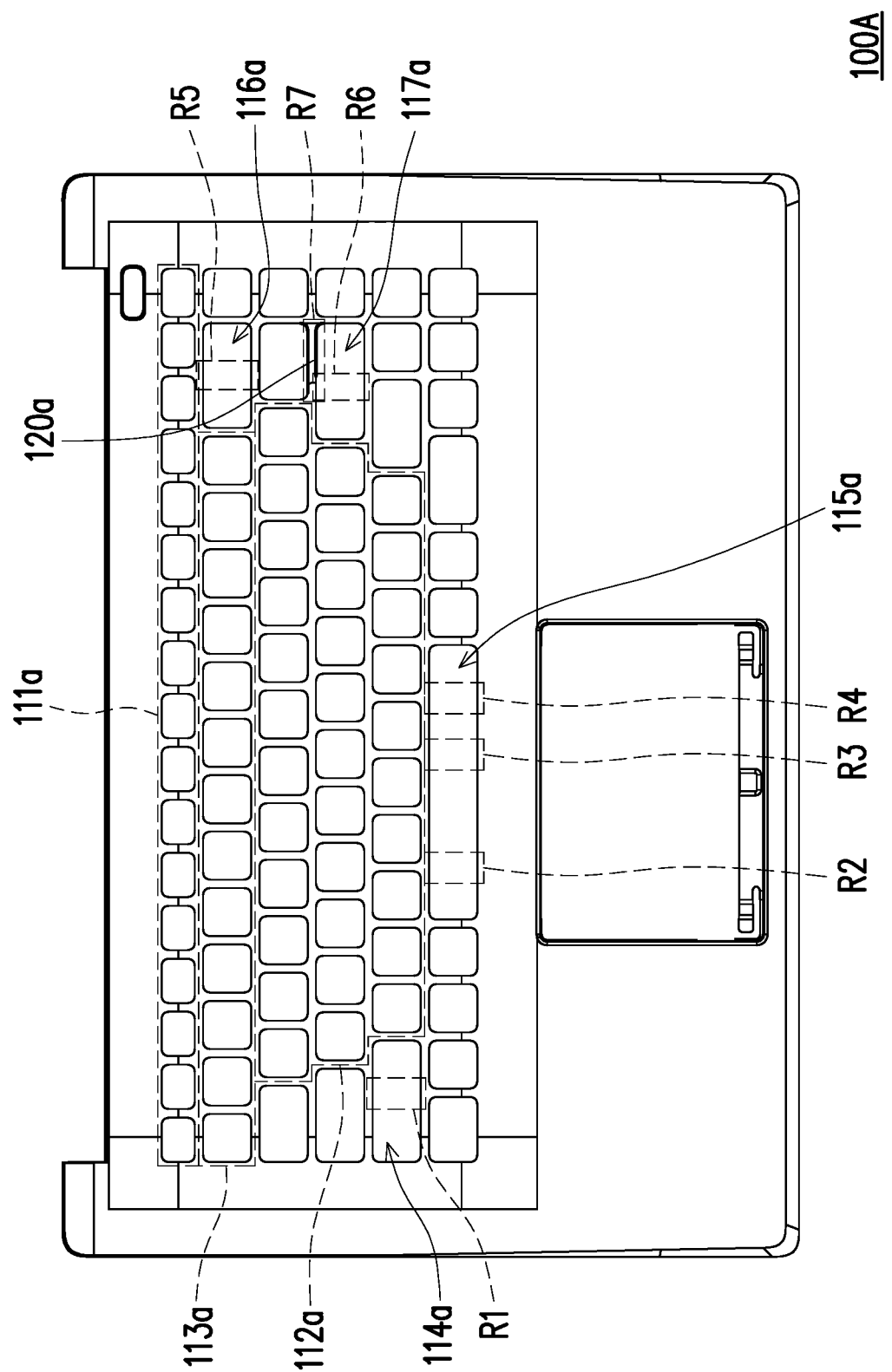
FIG. 4A is a schematic top plan view of the modular frame of FIG. 3A switched to the first configuration.

FIG. 4A is a schematic top plan view of the modular frame of FIG. 3A switched to the first configuration.

With reference to FIG. 3A and FIG. 4A, when the modular frame 100a is to be switched to the first configuration (see FIG. 4A), one rib structure 120a is disposed in the seventh processing region R7, to divide the enter key hole 117a into two sub-key holes by the rib structure 120a of the seventh processing region R7. As for the shift key hole 114a, the space key hole 115a, and the backspace key hole 116a, each of them is presented as a single key hole in a rectangular appearance.

Figure 4B:
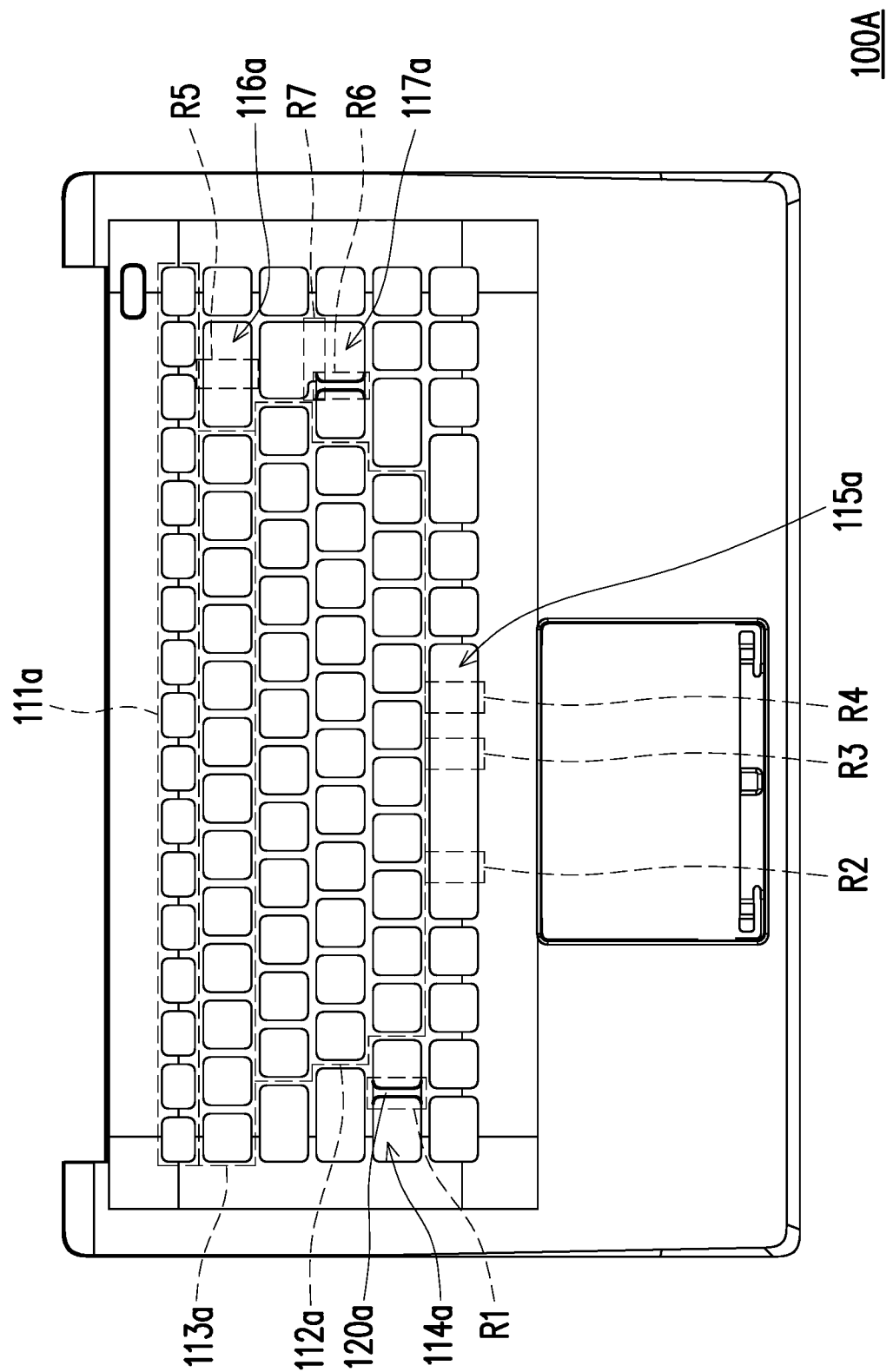
FIG. 4B is a schematic top plan view of the modular frame of FIG. 3A switched to the second configuration.

FIG. 4B is a schematic top plan view of the modular frame of FIG. 3A to be switched to the second configuration.

With reference to FIG. 3A and FIG. 4B, when the modular frame 100a is switched to the second configuration (see FIG. 4B), the at least one rib structure 120a includes two rib structures 120a respectively disposed in the first processing region R1 and the sixth processing region R6. The shift key hole 114a is divided into two sub-key holes by the rib structure 120a of the first processing region R1. The enter key hole 117a is divided into two sub-key holes by the rib structure 120a of the sixth processing region R6. As for the space key hole 115a and the backspace key hole 116a, each of them is presented as a single key hole in a rectangular appearance.

Figure 4C:
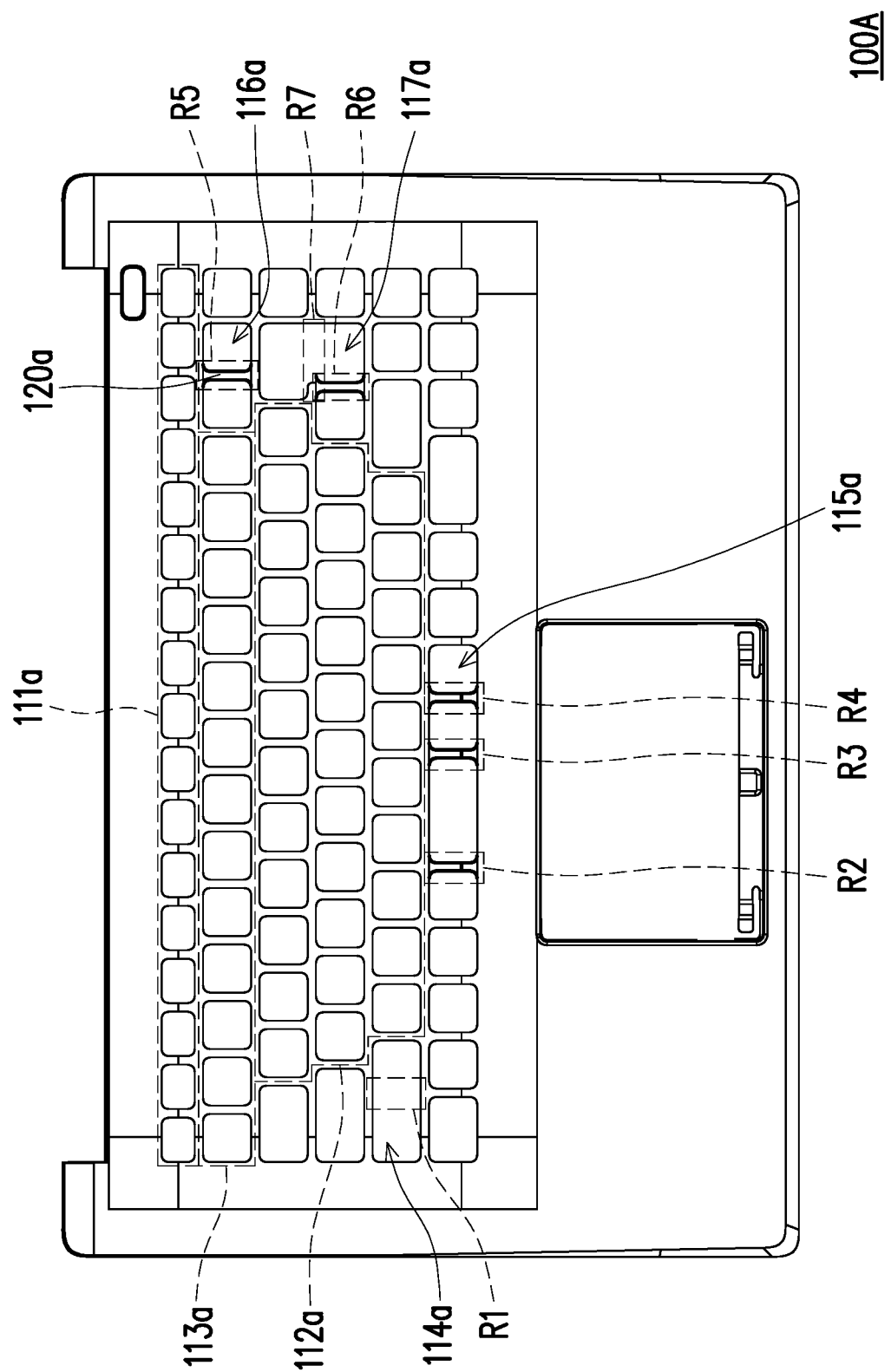
FIG. 4C is a schematic top plan view of the modular frame of FIG. 3A switched to the third configuration.

FIG. 4C is a schematic top plan view of the modular frame of FIG. 3A to be switched to the third configuration.

With reference to FIG. 3A and FIG. 4C, when the modular frame 100a is switched to the third configuration (see FIG. 4C), the at least one rib structure 120a includes five rib structures 120a respectively disposed in the second processing region R2 to the sixth processing region R6. The space key hole 115a is divided into four sub-key holes by the rib structures 120a of the second processing region R2 to the fourth processing region R4. The backspace key hole 116a is divided into two sub-key holes by the rib structure 120a of the fifth processing region R5. The enter key hole 117a is divided into two sub-key holes by the rib structure 120 of the sixth processing region R6. As for, the shift key hole 114a, it is presented as a single key hole in a rectangular appearance.

In summary of the foregoing, the modular frame of the disclosure includes the first processing region to the seventh processing region on which processes (such as a punching, cutting, or hot melt process) may be selectively performed to change the keyboard configuration. It is not only possible that the rib structures formed in the first processing region to the seventh processing region are adapted to be selectively cut through a punching or cutting process, thereby switching the modular frame to the first configuration, the second configuration, or the third configuration, but the rib structure may also be selectively mounted in the first processing region to the seventh processing region, and multiple rib structures may be fixed to the corresponding first processing region to seventh processing region adopting a hot melt process, thereby switching the modular frame to the first configuration, the second configuration, or the third configuration.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A modular frame, comprising:
   a push-button area comprising:
   a function key hole group disposed at a top end of the push-button area;
   an alphabet key hole group disposed at a middle of the push-button area;

a number key hole group disposed between the function key hole group and the alphabet key hole group;

a shift key hole located at one side of the alphabet key hole group, wherein the shift key hole comprises a first processing region;

a space key hole disposed at a bottom end of the push-button area opposite to the function key hole group, wherein the space key hole comprises a second processing region, a third processing region, and a fourth processing region;

a backspace key hole located between the function key hole group and the alphabet key hole group and at one side of the number key hole group, wherein the backspace key hole comprises a fifth processing region; and an enter key hole located in the alphabet key hole group and below the backspace key hole, wherein the enter key hole comprises a sixth processing region and a seventh processing region; and a plurality of rib structures selectively disposed in at least one of the first processing region to the seventh processing region, wherein the first processing region to the seventh processing region are selectively performed with a process to switch the modular frame to a first configuration, a second configuration, or a third configuration.

2. The modular frame as described in claim 1, wherein the plurality of rib structures are respectively formed in the first processing region to the seventh processing region, wherein the rib structures divide the shift key hole into two sub-key holes, divide the space key hole into four sub-key holes, divide the backspace key hole into two sub-key holes, and divide the enter key hole into three sub-key holes.

3. The modular frame as described in claim 2, wherein in the first configuration, the rib structures formed in the first processing region to the sixth processing region are cut through a punching or cutting process to present the shift key hole, the space key hole, and the backspace key hole each as a single key hole and present the enter key hole as two sub-key holes.

4. The modular frame as described in claim 2, wherein in the second configuration, the rib structures formed in the second processing region to the fifth processing region and the seventh processing region are cut through a punching or cutting process to present the space key hole and the backspace key hole each as a single key hole and present the enter key hole as two sub-key holes.

5. The modular frame as described in claim 2, wherein in the third configuration, two rib structures formed in the first processing region and the seventh processing region are cut through a punching or cutting process to present the shift key hole as a single key hole and present the enter key hole as two sub-key holes.

6. The modular frame as described in claim 2, wherein a gap is formed between each of the rib structures and a top surface of the push-button area.

7. The modular frame as described in claim 2, wherein two rib structures in the enter key hole are perpendicular to each other.

8. The modular frame as described in claim 1, wherein each of the rib structures comprises two engaging portions and two through holes, and each of the first processing region to the seventh processing region comprises two positioning grooves and two hot melt pillars, the two engaging portions of each of the rib structures are adapted to be disposed in the corresponding two positioning grooves, the two hot melt pillars are adapted to be disposed through the corresponding two through holes, and each of the hot melt pillars is adapted to melt when heated, to adhere each of the rib structures to the push-button area.

9. The modular frame as described in claim 1, wherein in the first configuration, one of the rib structures is disposed in the seventh processing region to divide the enter key hole into two sub-key holes.

10. The modular frame as described in claim 1, wherein in the second configuration, the plurality of rib structures comprises two rib structures respectively disposed in the first processing region and the sixth processing region to divide the shift key hole into two sub-key holes and divide the enter key hole into two sub-key holes.

11. The modular frame as described in claim 1, wherein in the third configuration, the plurality of rib structures comprises five rib structures respectively disposed in the second processing region to the sixth processing region to divide the space key hole into four sub-key holes, divide the backspace key hole into two sub-key holes, and divide the enter key hole into two sub-key holes.

\* \* \* \* \*